US010669841B1

(12) United States Patent
Erdos et al.

(10) Patent No.: US 10,669,841 B1
(45) Date of Patent: Jun. 2, 2020

(54) SYSTEMS AND METHODS FOR REDUCING ELECTRICAL INTERFERENCE IN MEASUREMENT-WHILE-DRILLING DATA

(71) Applicant: Erdos Miller, Inc., Houston, TX (US)

(72) Inventors: David Erdos, Houston, TX (US); Ken Miller, Houston, TX (US); Nathan Szanto, Houston, TX (US)

(73) Assignees: Basin Drilling Tools LP, New York, NY (US); Erdos Miller, Inc., Houston, TX (US)

( * ) Notice: Subject to any disclaimer, the term of this patent is extended or adjusted under 35 U.S.C. 154(b) by 0 days.

(21) Appl. No.: 16/676,619

(22) Filed: Nov. 7, 2019

(51) Int. Cl.
*E21B 47/12* (2012.01)
*H04B 15/00* (2006.01)
*H04B 1/16* (2006.01)

(52) U.S. Cl.
CPC ......... *E21B 47/122* (2013.01); *H04B 1/1615* (2013.01); *H04B 15/00* (2013.01)

(58) Field of Classification Search
CPC ........ E21B 47/122; E21B 47/12; E21B 47/18; E21B 47/187; H04B 1/1615; H04B 15/00; G01V 11/002; G01V 1/22
See application file for complete search history.

(56) References Cited

U.S. PATENT DOCUMENTS

| | | | |
|---|---|---|---|
| 6,519,568 B1* | 2/2003 | Harvey | G01V 11/002 705/1.1 |
| 6,985,750 B1* | 1/2006 | Vicknair | H04W 8/20 370/310 |
| 2002/0113718 A1* | 8/2002 | Wei | E21B 47/12 340/855.3 |
| 2004/0108114 A1* | 6/2004 | Lerche | E21B 17/003 166/302 |
| 2004/0234269 A1* | 11/2004 | Laamanen | H04L 12/2885 398/135 |
| 2005/0026565 A1* | 2/2005 | Goldstein | H04L 27/2657 455/67.11 |
| 2013/0147633 A1* | 6/2013 | Sumrall | E21B 47/124 340/854.4 |
| 2013/0168084 A1* | 7/2013 | Conn | G01N 19/02 166/250.01 |
| 2016/0291193 A1* | 10/2016 | Williams | E21B 47/02216 |

* cited by examiner

*Primary Examiner* — Omer S Khan
(74) *Attorney, Agent, or Firm* — Dickinson Wright, PLLC; Michael E. Noe, Jr.; Jonathan H. Harder

(57) ABSTRACT

Systems and methods are presented for reducing electrical interference in measurement-while-drilling ("MWD") data. An example may include, among other features a MWD data acquisition system including an analog data reception for receiving analog MWD data, an analog-to-digital conversion circuit, at least one isolation circuit for electrically isolating the analog data reception circuit and the analog-to-digital conversion circuit from a digital data transmission circuit. In some implementations, the data reception device may be at least partially powered by the battery.

10 Claims, 7 Drawing Sheets

SYSTEMS AND METHODS FOR REDUCING ELECTRICAL INTERFERENCE IN MEASUREMENT-WHILE-DRILLING DATA

TECHNICAL FIELD

This disclosure relates generally to measurement-while-drilling D) data and, in particular, to reducing interference in MWD data.

BACKGROUND

A problem encountered with MWD data provided by electromagnetic (EM) telemetry is signal integrity between capture, at the drill string or bore hole and the EM ground rod, and data acquisition system, typically a remote computer, or rig floor display, where operators view the MWD data. As such, a solution is needed to address signal integrity of MWD data provided by EM telemetry technology.

SUMMARY

A measurement-while-drilling data acquisition system is disclosed. The measurement-while-drilling data acquisition includes a data reception device. The data reception device includes an analog data reception circuit configured to receive analog measurement-while-drilling data, an analog-to-digital conversion circuit, a first isolation circuit configured to electrically isolate the analog data reception circuit and the analog-to-digital conversion circuit from a digital data transmission circuit.

A method of operating a measurement-while-drilling data acquisition system, the method is disclosed. The method includes receiving analog measurement-while-drilling data at an analog data reception circuit of a data reception device having a digital data transmission circuit of the measurement-while-drilling data acquisition system, where the analog data reception circuit and an analog-to-digital conversion circuit are electrically isolated from the digital data transmission circuit of the data reception device, converting at least a portion of the analog measurement-while-drilling data into digital measurement-while-drilling data using the analog-to-digital conversion circuit, and sending the digital measurement-while-drilling data as transmitted digital measurement-while-drilling data via the digital data transmission circuit of the data reception device.

Another method of operating multiple measurement-while-drilling data acquisition systems is disclosed. The method includes receiving, at the multiple measurement-while drilling systems, analog measurement-while-drilling data at analog data reception circuits of multiple data reception devices each having digital data transmission circuits, where the analog data reception circuits and analog-to-digital conversion circuits are electrically isolated from the digital data transmission circuits in each of the data reception devices. The method further includes converting at least a portion of the analog measurement-while-drilling data into digital measurement-while-drilling data using the analog-to-digital conversion circuits. The method further includes sending the digital measurement-while-drilling data as digital data transmissions via the digital data transmission circuits. The method further includes aggregating the digital data transmissions from the multiple measurement-while-drilling data acquisition systems at a central computer. The method further includes comparing received signals from the multiple measurement-while-drilling data acquisition systems. The method further includes determining an optimal channel to decode on based on at least one of the following parameters: signal to noise ratio based on the received signal strengths, bit error detection, signal amplitude, or total harmonic distortion.

Other technical features may be readily apparent to one skilled in the art from the following figures, descriptions, and claims. These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and in the claims, the singular form of 'a', 'an', and 'the' include plural referents unless the context clearly dictates otherwise.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure are by way of illustration only and should not be construed in any way to limit the scope of the disclosure.

A measurement-while-drilling (MWD) data acquisition system 100 using electromagnetic (EM) telemetry is disclosed.

Figure 1:
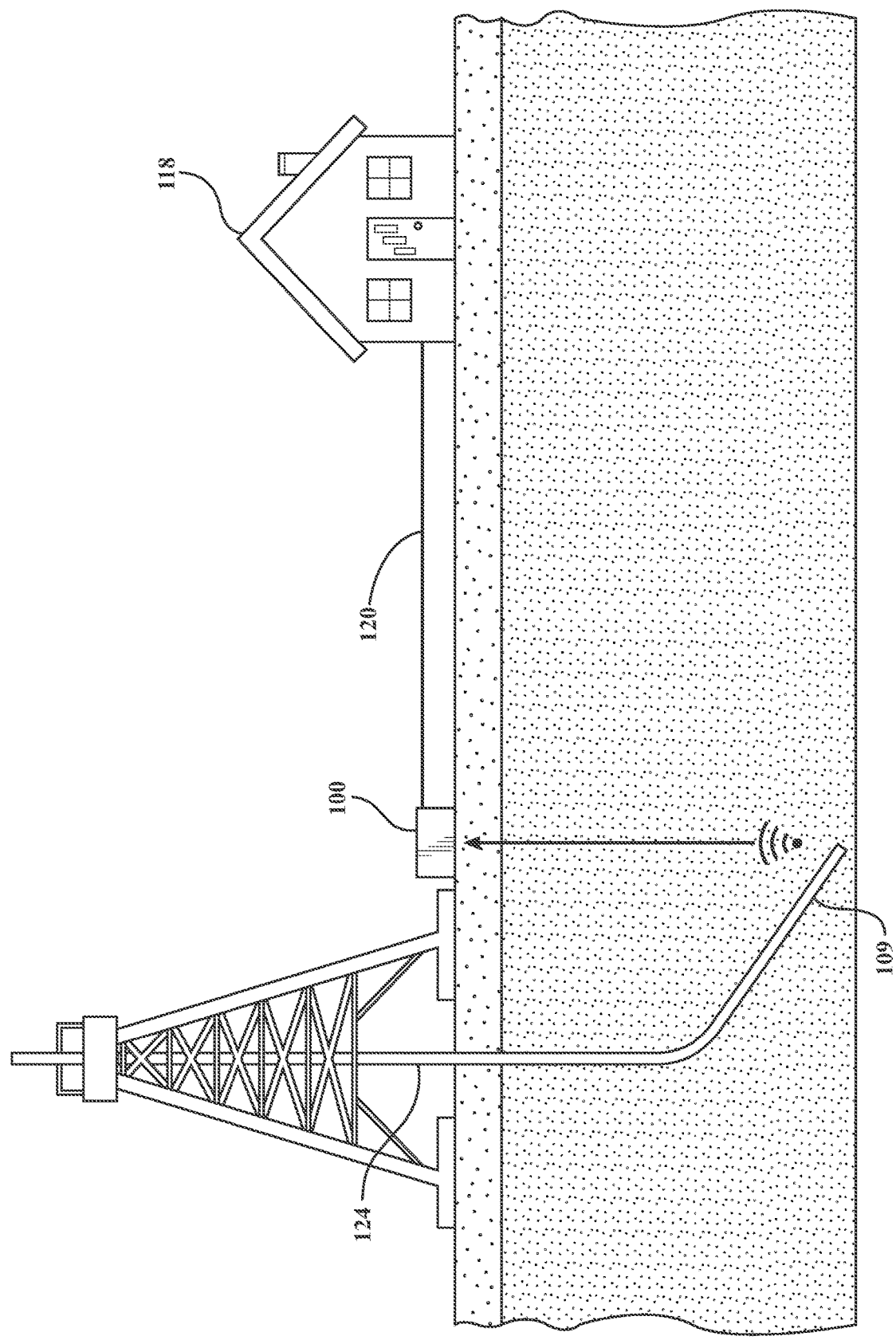
FIG. 1 is an illustration of a MWD system in a well sending data to an embodiment of a MWD data acquisition system.
Figure 2:
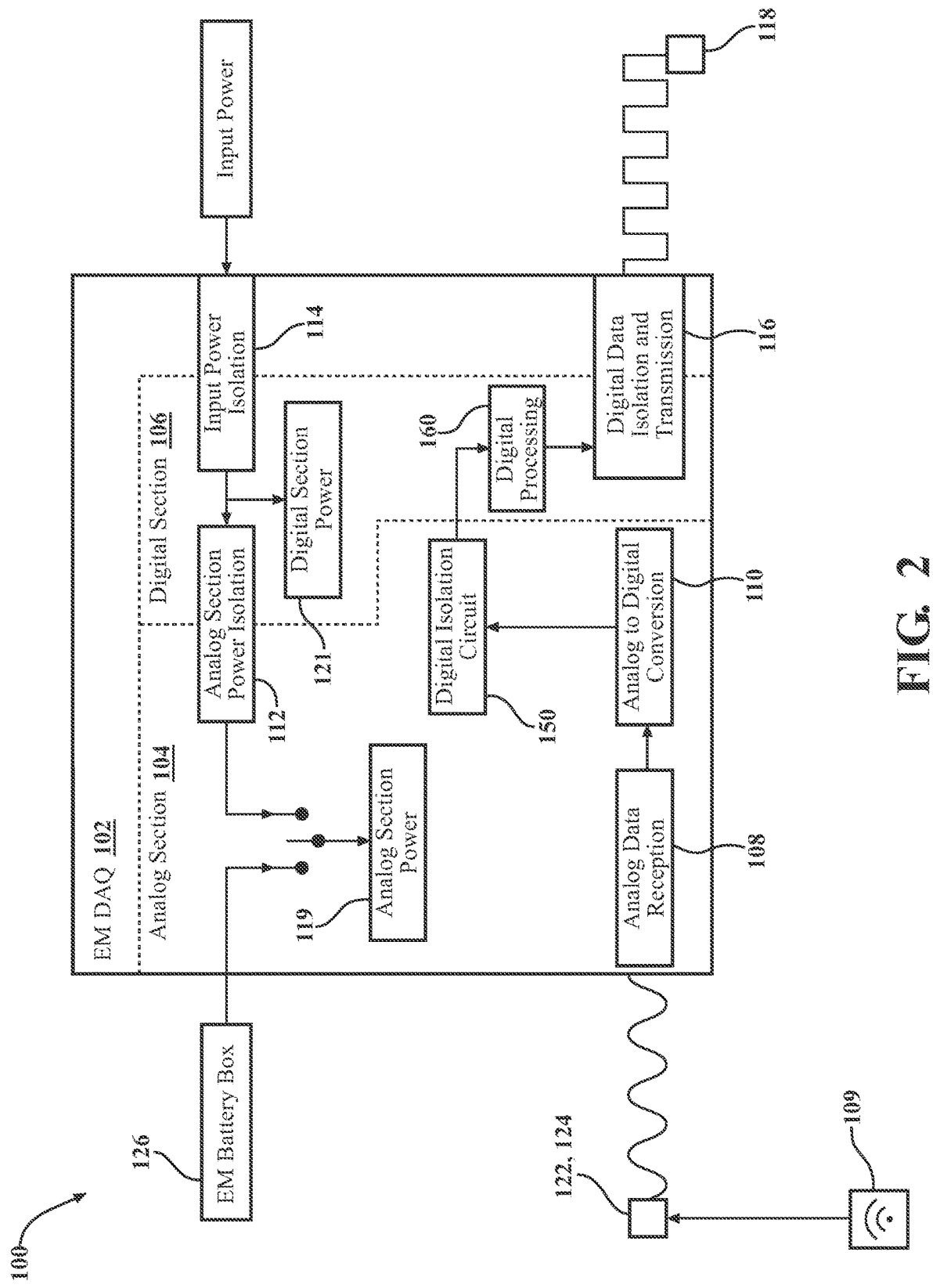
FIG. 2 illustrates a high-level component diagram of an illustrative system architecture, according to some embodiments of this disclosure.
Figure 3:
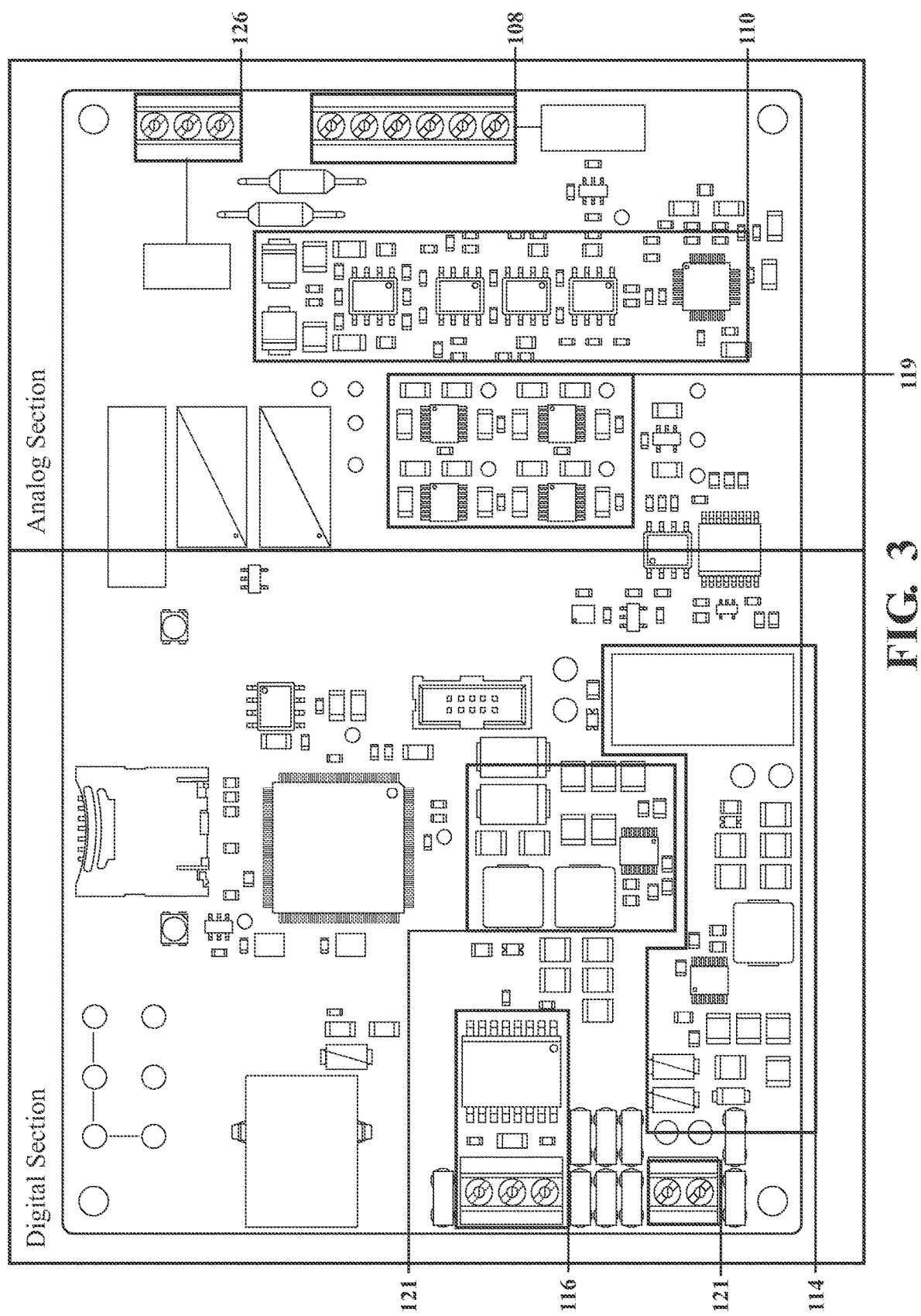
FIG. 3 illustrates a schematic diagram of an embodiment of the illustration of FIG. 2.

FIG. 1 shows the MWD data acquisition system 100 as placed next to an oil rig. FIG. 2 illustrates a high-level component diagram of an illustrative system architecture, according to some embodiments of this disclosure. FIG. 3 illustrates a schematic diagram of an embodiment of the illustration of FIG. 2. For purpose of clarity, FIGS. 1-3 are discussed together below.

The MWD data acquisition system 100 includes at least one data reception device 102. In some embodiments, there may be more than one data reception device 102. The data reception device is split into two sections: an analog section 104 and a digital section 106. The analog section 104 includes an analog data reception circuit 108 configured to receive analog MWD data from an MWD tool 109. The analog section 104 of the data reception device 102 further includes an analog-to-digital conversion circuit 110.

Embodiments of the analog section 104 of the data reception device 102 (also referred to as "EM DAQ" in the FIGURES) can include a first isolation circuit 112 (also referred to as "Analog Section Power Isolation" in FIG. 2) configured to electrically isolate the power for the analog data reception circuit 108 (also referred to as "Analog Data Reception" in FIG. 2) and the analog-to-digital conversion circuit 110 (also referred to as "Analog to Digital Conversion" in FIG. 2) from a digital section power domain formed by input power isolation 114 (also referred to as "Input Power Isolation" in FIG. 2). In some embodiments the first isolation circuit 112 is a first galvanically-isolated power supply circuit with at least about 100 Volts of isolation. A galvanic isolation circuit is a circuit that prevents current flow between two portions of an electrical system but still allows the exchange of information or energy by, for example, capacitance, induction, or electromagnetic waves. Examples of methods for creating galvanic isolation circuits can include using transformers, opto-isolators, capacitors, Hall Effect sensors, magnetoresistance and/or relays. Providing isolation substantially reduces electromagnetic interference in and greatly improves the quality of the MWD data.

In some embodiments, the data reception device 102 can include a second isolation circuit 114 (also referred to as "Input Power Isolation" in FIG. 2) configured to electrically isolate the analog data reception circuit 108 and the analog-to-digital conversion circuit 110 from a digital data and isolation transmission circuit 116 (also referred to as "Digital Data Isolation and Transmission" in FIG. 2). In some embodiments the second isolation circuit 114 is a second galvanic isolation circuit with at least about 100 Volts of isolation. In some embodiments, the analog section may also include a digital isolation circuit 150. The digital isolation circuit 150 may electrically isolate the analog-to-digital conversion circuit 110 from a digital processing circuit 160 and/or a digital data isolation and transmission circuit 116.

The digital section 106 includes the digital data isolation and transmission circuit 116. In some embodiments, the digital data isolation and transmission circuit 116 is configured to transmit digital data to a remote computer system 118 (often called a rig floor display (RFD)) via a data cable 120 using, for example, one of the following cable and communication standards: RS-232, RS-422, RS-485, Ethernet, USB, or CAN bus. In some embodiments, the digital section 106 also includes a digital processing circuit 160. The digital processing circuit 160 may perform a variety of signal processing operations (e.g., linear and/or non-linear). For example, error detection and correction may be performed, as well as data compression. The remote computer system 118 allows operators to view the MWD data at a rig floor display. In some embodiments, the data cable 120 is further configured to provide at least about 100 mW of power to the data reception device 102 as analog section power 119 and digital section power 121. In some embodiments, the data cable 120 is configured to provide at least about 100 mW of digital section power 121 to only the digital section 106 of the data reception device 102.

In some embodiments, the digital data and isolation transmission circuit 116 is configured to transmit digital data to the remote computer system 118 wirelessly. In some embodiments, the digital data and isolation transmission circuit 116 is configured to transmit digital data to the remote computer system 118 wirelessly via one of the following frequencies: 433 MHz, 900 MHz, 2.4 GHz, or 5.8 GHz. In some embodiments, the digital data isolation and transmission circuit 116 is configured to transmit digital data to the remote computer system 118 via a wired connection via the data cable 120.

The MWD data acquisition system 100 is in electrical communication with at least one electromagnetic (EM) ground rod 122 and an oil well EM element 124 that can include a connection with the blow out preventer (BOP), the casing, top drive or other conductive element on the oil well assembly. In some embodiments, the MWD data acquisition system 100 is positioned about 10 feet to about 50 feet from at least one EM ground rod 122. In one example, keeping the distance between the MWD data acquisition system and the ground rod below about 50 feet reduces the length of the analog signal path, which further reduces degradation of the analog signal. In some embodiments, the oil well element 124 can be at least about 100 feet or more away from the ground rod 122. Once the MWD data has been transferred from analog data to digital data by the analog-to-digital conversion circuit 110, the data has a much lower probability of degradation and can be transmitted by the digital data isolation and transmission circuit 116 with less concern for degradation of the MWD data.

In some embodiments, the data reception device 102 is at least partially powered by at least one battery 126 capable of supplying at least a total of about 3 Volts to provide for the analog section power 119 and the digital section power 121. The at least one battery 126 may be included in the MWD data acquisition system 100. In some embodiments, the data reception device 102 is entirely powered by at least one battery 126 capable of supplying at least a total of about 3 Volts. In some embodiments, the analog section 104 of the data reception device 102 is entirely powered by at least one battery 126 capable of supplying at least a total of about 3 Volts to provide for only analog section power 119. Providing at least one battery 126 to power the analog section 104 substantially reduces electromagnetic interference from other electrical systems of the rig from corrupting the analog signal and, thus, significantly improves the quality of the MWD data.

Figure 4:
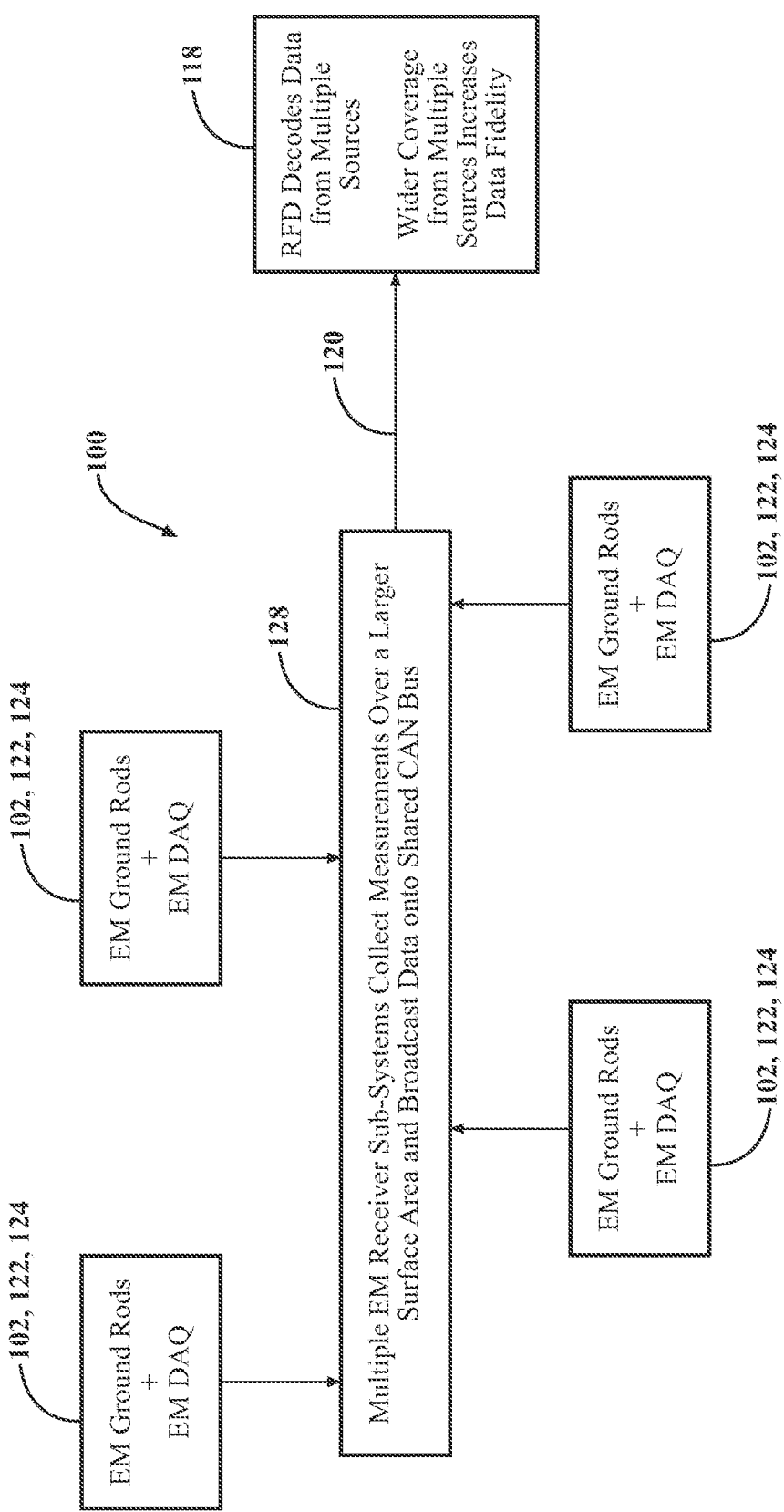
FIG. 4 is a schematic diagram of another alternate embodiment of a MWD data acquisition system.

FIG. 4 is a schematic diagram of another alternate embodiment of the MWD data acquisition system 100 including multiple data reception devices 102. The digital data isolation and transmission circuits 116 of each of the data reception devices 102 are configured to transmit the MWD data to a shared CAN bus 128, which then transmits the data to the remote computer system 118.

Figure 5:
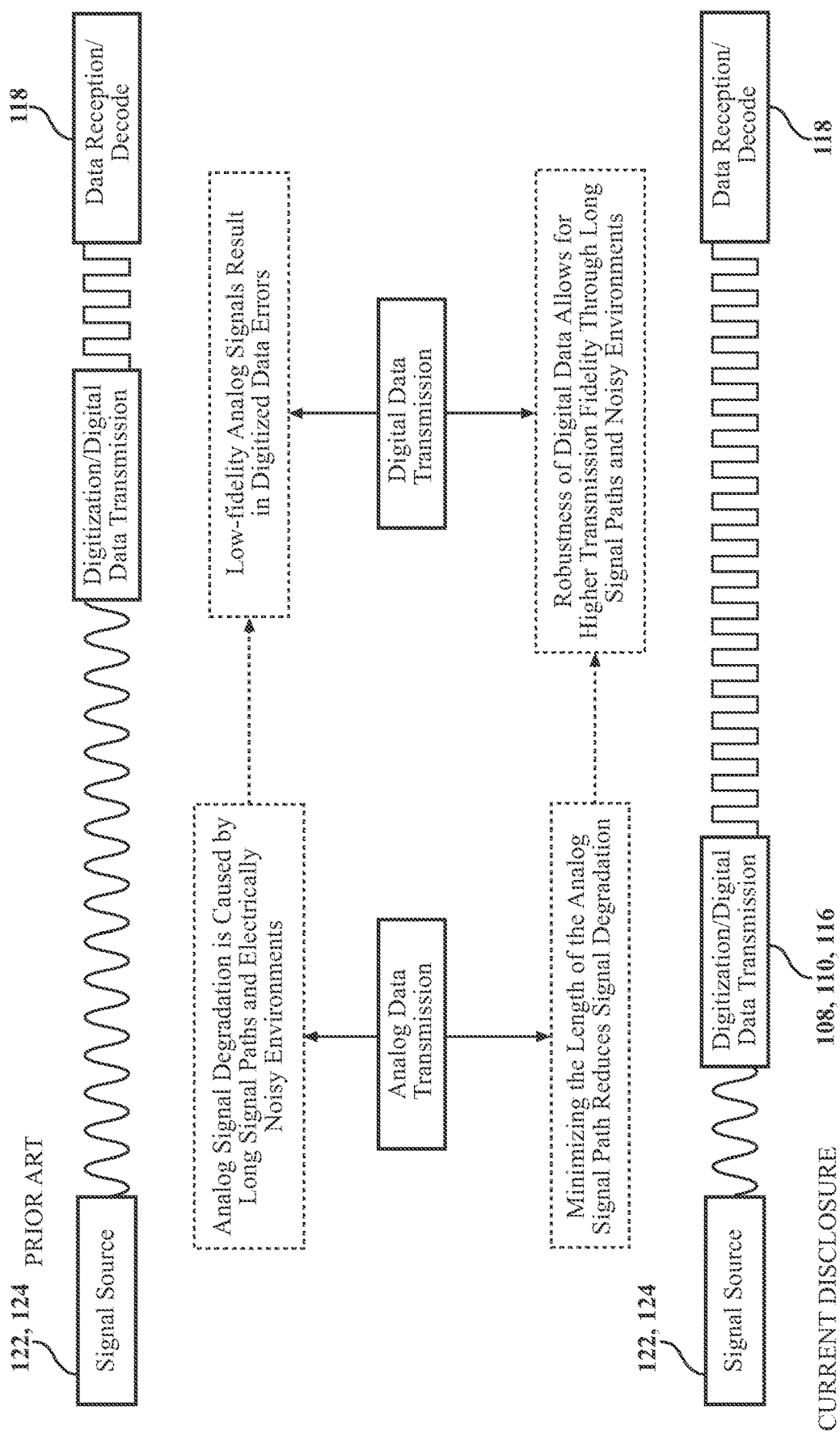
FIG. 5 is a schematic diagram of a side-by-side comparison of a typical MWD data acquisition system (top half) to the MWD data acquisition system of the disclosure (bottom half)

FIG. 5 is a schematic diagram of a side-by-side comparison of a typical MWD data acquisition system (top half) to the MWD data acquisition system of the disclosure (bottom half). The diagram illustrates the benefits of the disclosed system as compared to the prior art. By reducing the length of the analog signal path by placing the MWD data acquisition system 100 between about 10 feet and about 50 feet from the EM ground rod 122, the analog signal is acquired with reduced or insignificant degradation Analog signal degradation is further reduced by isolating the analog data reception circuit 108 and the analog-to-digital conversion circuit 110. Analog signal degradation is further reduced by using a battery 126 to power the analog section 104 including the analog data reception circuit 108 instead of power from another outside source.

Figure 6:
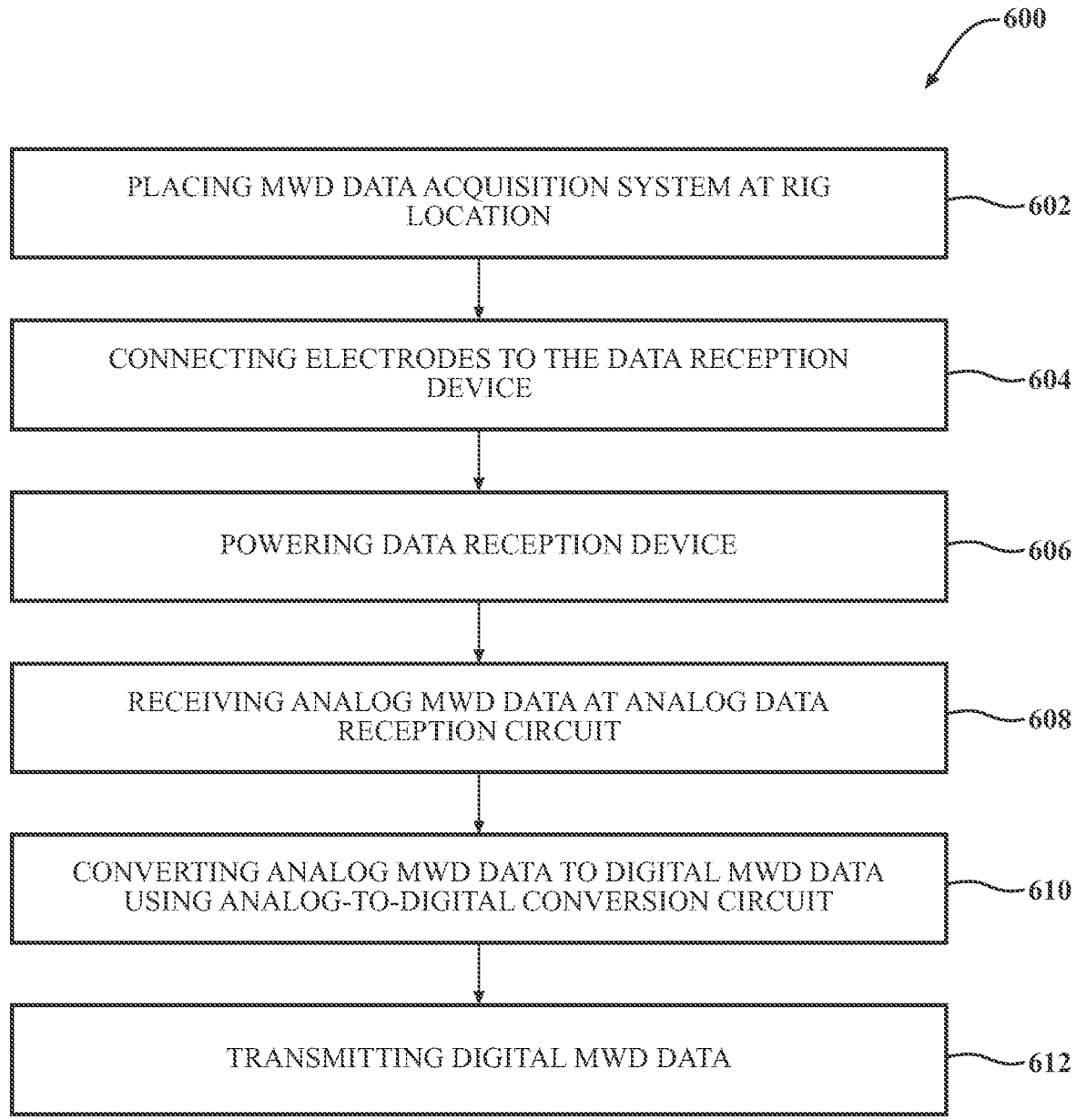
FIG. 6 illustrates a method of operating a MWD data acquisition system.

A method 600 of operating a MWD data acquisition system 100 that includes a data reception device 102 and/or the at least one battery 126 is disclosed and shown in FIG. 6. The method 600 may be performed by one or more processing devices of the data reception device 102. In some embodiments, the method 600 may be implemented in software, firmware, and/or hardware circuitry. For example, various operations may be performed by one or more components of the data reception device 102, such as the analog data reception circuit 108, one or more isolation circuits (e.g., input power isolation, digital data isolation and transmission), an analog-to-digital conversion circuit 110, a digital data isolation and transmission circuit 116, or some combination thereof.

The method 600 includes step 602 of placing a MWD data acquisition system 100 at a rig location. be placed at least about 10 feet from an at least one EM ground rod 122. In some embodiments, step 602 includes placing the MWD data acquisition system 100 at least about 30 feet from the at least one EM ground rod 122. In some embodiments, step 602 includes placing the MWD data acquisition system 100 at least about 50 feet from the at least one EM ground rod 122.

The MWD data acquisition system 100 may include an analog data reception circuit 108 and an analog-to-digital conversion circuit 110 that are electrically isolated from a digital processing circuit 160 and a digital data isolation and transmission circuit 116 of the data reception device 102. In some embodiments, electrically isolating the analog data reception circuit 108 and the analog-to-digital conversion circuit 110 of the data reception device 102 includes galvanically isolating the analog data reception circuit 108 and the analog-to-digital conversion circuit 110 from the digital processing circuit 160 and the digital data isolation and transmission circuit 116. In some embodiments, galvanically isolating may refer to isolating sections of the analog data reception circuit 108 to prevent current flow. Galvanic isolation may be used where sections communicate but their grounds may be at different potential. Galvanic isolation may refer to breaking ground loops by preventing unwanted current from flowing between two units sharing a ground conductor.

In some embodiments, the method 600 includes step 604 of connecting electrodes to the data reception device 102. Step 606 includes partially powering data reception device 102 using at least one battery 126 capable of supplying at least a total of about 3 Volts. In some embodiments, step 606 includes entirely powering data reception device 102 using at least one battery 126 capable of supplying at least a total of about 3 Volts. In some embodiments, step 606 includes entirely powering an analog section 104 of the data reception device 102 using at least one battery 126 capable of supplying at least a total of about 3 Volts. In some embodiments, step 606 includes entirely powering the data reception device 102 using the data cable 120. In some embodiments, step 606 includes at least partially powering the data reception device 102 using the data cable 120. In some embodiments, step 606 includes entirely powering the digital section 106 using the data cable 120.

The method 600 further includes step 608 of receiving analog MWD data at an analog data reception circuit 108 of a data reception device 102 having a digital data isolation and transmission circuit 116 of the MWD data acquisition system 100. The analog MWD data may be amplified, low-passed, and/or bandpassed filtered.

The method 600 further includes step 610 of converting at least a portion of the analog MWD data into digital MWD data using the analog-to-digital conversion circuit 110. In some embodiments, the method includes converting all of the analog MWD data into digital MWD data using the analog-to-digital conversion circuit 110.

The method 600 further includes step 612 of sending the digital MWD data as transmitted digital MWD data via the digital data isolation and transmission circuit 116 of the data reception device 102. In some embodiments, the digital data isolation and transmission circuit 116 is configured to transmit digital data to a remote computer system 118 wirelessly. In some embodiments, the digital data isolation and transmission circuit 116 is configured to transmit digital data to the remote computer system 118 wirelessly on one of the following frequencies: 433 MHz, 900 MHz, 2.4 GHz, or 5.8 GHz. In some embodiments, the digital data isolation and transmission circuit 116 is configured to transmit digital data via one of RS-232, RS-422, RS-485, USB, or CAN bus, to a remote computer system via a data cable 120. In some embodiments, the data cable 120 is further configured to provide at least about 100 mW power to the data reception device 102. In some embodiments, the data cable 120 is further configured to provide at least about 100 mW power to only the digital section 106 of the data reception device 102.

Figure 7:
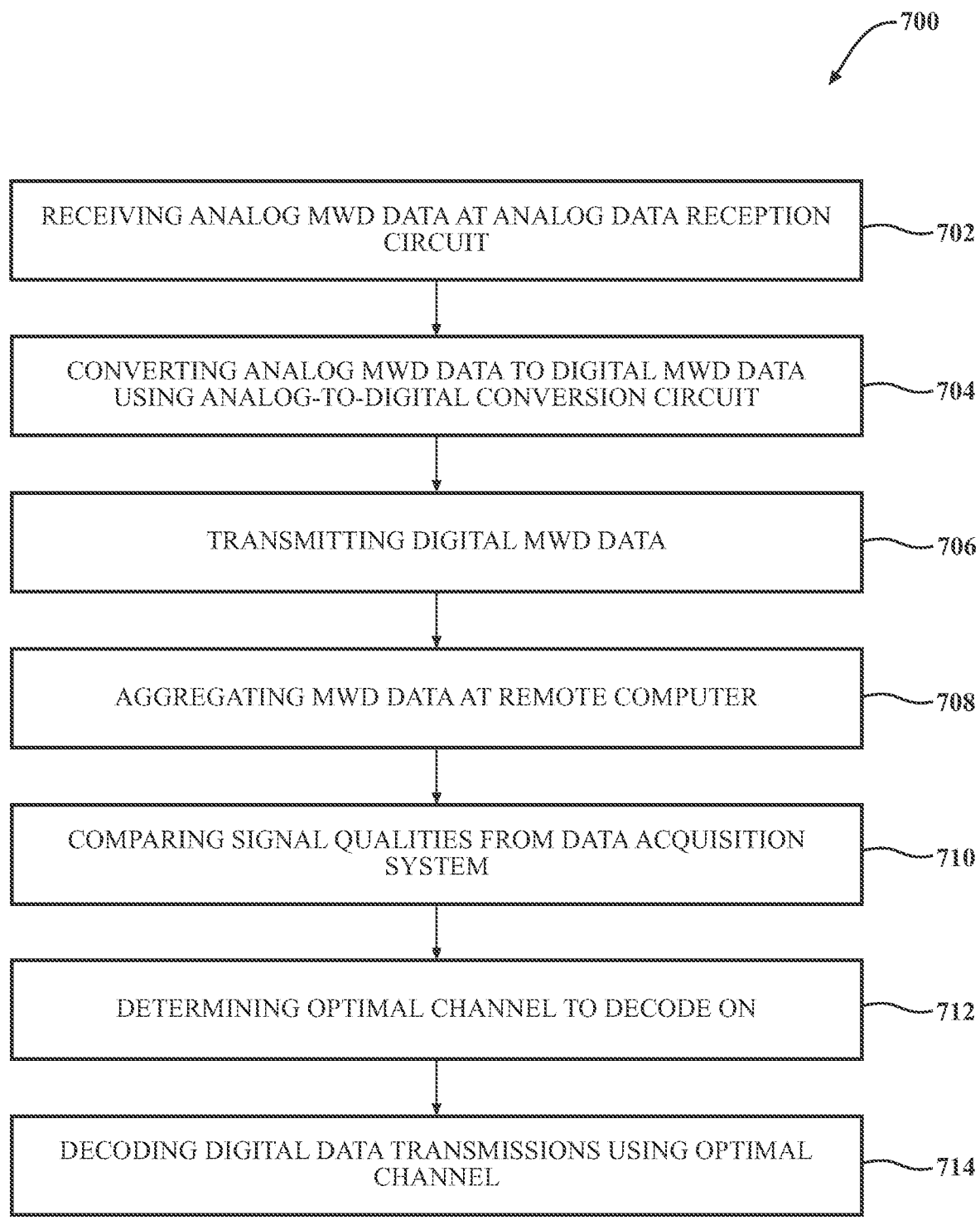
FIG. 7 illustrates another method of operating a MWD data acquisition system.

Another method 700 of operating a MWD data acquisition system 100 including multiple analog data reception circuits 108 is disclosed and shown in FIG. 7. The method 700 may be performed in a similar manner as the method 600. In some embodiments, various operations of the method 700 may be performed by the data reception device 102, the shared CAN bus 128, and/or the remote computer system 118.

The method 700 includes step 702 of receiving analog MWD data at the analog data reception circuits 108 of multiple data reception devices 102. The analog data reception circuits 108 and analog-to-digital conversion circuits 110 may be electrically isolated from the digital processing circuits 160 and the digital isolation and transmission circuits 116 in each of the data reception devices 102. In some embodiments, each of the data reception devices 102 are placed at least 10 feet from an at least one EM ground rod 122. In some embodiments, each of the data reception devices 102 are placed at least about 30 feet from the at least one EM ground rod 122. In some embodiments, each of the data reception devices 102 are placed at least 50 feet from the at least one EM ground rod 122.

The method 700 further includes step 704 of converting at least a portion of the analog MWD data into digital MWD data using the analog-to-digital conversion circuits 110.

The method 700 further includes step 706 of sending the digital MWD data as digital data transmissions using the digital data isolation and transmission circuit 116. In some embodiments, the digital data isolation and transmission circuit 116 is configured to transmit digital data via one of RS-232, RS-422, RS-485, USB, or CAN bus, to a remote computer system 118 via a data cable 120.

In some embodiments, the data cable 120 is further configured to provide at least about 100 mW of power to the data reception device 102. In some embodiments, the data cable 120 is configured to provide at least about 100 mW of power to only the digital section 106 of the data reception device 102. In some embodiments, the digital data isolation and transmission circuit 116 is configured to transmit digital data to a remote computer system 118 wirelessly. In some embodiments, digital data isolation and transmission circuit 116 is configured to transmit digital data to a remote computer system 118 wirelessly via one of the following frequencies: 433 MHz, 900 MHz, 2.4 GHz, or 5.8 GHz.

The method 700 further includes step 708 of aggregating the digital data transmissions from the MWD data acquisition system at a remote computer system 118.

The method 700 further includes step 710 of comparing received signal quality from the MWD data acquisition system.

The method 700 further includes step 712 of determining an optimal channel to decode on based on at least one of the following parameters: signal to noise ratio based on the received signal qualities, bit error detection, signal amplitude, or total harmonic distortion.

In some embodiments, the method 700 further includes step 714 of decoding the digital data transmissions using the optimal channel.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

Consistent with the above disclosure, the examples of systems and method enumerated in the following clauses are specifically contemplated and are intended as a non-limiting set of examples.

1. A measurement-while-drilling data acquisition system comprising:
 a data reception device, the data reception device comprising:
  an analog data reception circuit configured to receive analog measurement-while-drilling data;
  an analog-to-digital conversion circuit;
  a first isolation circuit configured to electrically isolate the analog data reception circuit and the analog-to-digital conversion circuit from a digital data processing and a digital transmission circuit.

2. The system of clause 1, wherein the measurement-while-drilling data acquisition system is positioned at least 10 feet from an electromagnetic ground rod, wherein one data input comprises a connection to a well element and a second data input comprises a connection to a ground rod.

3. The system of clause 1, wherein the measurement-while-drilling data acquisition system is positioned at least 10 feet from a remote computer configured to receive digital measurement-while-drilling data from the digital data transmission circuit.

4. The system of clause 1, further comprising at least one battery capable of supplying a total of 3 Volts or more, wherein the data reception device is at least partially powered by the at least one battery.

5. The system of clause 1, further comprising at least one battery capable of supplying a total of 3 Volts or more, wherein the data reception device can be fully powered by the at least one battery.

6. The system of clause 1, wherein the digital data transmission circuit is configured to transmit digital data via one of RS-232, RS-422, RS-485, Ethernet, USB, or CAN bus, to a remote computer system via a data cable.

7. The system of clause 6, wherein the data cable is further configured to provide at least 100 mW of power to the data reception device.

8. The system of clause 1, wherein the digital data transmission circuit is configured to transmit digital data to a remote computer system wirelessly via one of the following frequencies: 433 MHz, 900 MHz, 2.4 GHz, or 5.8 GHz.

9. The system of clause 1, wherein the first isolation circuit comprises a galvanic isolation circuit with at least 100 Volts isolation.

10. The system of clause 9, further comprising a second galvanic isolation circuit configured to electrically isolate the analog data reception circuit and the analog-to-digital conversion circuit from the digital data transmission circuit with at least 100 Volts isolation.

11. The system of clause 1, further comprising one or more additional data reception devices.

12. The system of clause 11, comprising a single CAN bus connected to all data reception devices.

13. A method of operating a measurement-while-drilling data acquisition system, the method comprising:
receiving analog measurement-while-drilling data at an analog data reception circuit of a data reception device having a digital data transmission circuit of the measurement-while-drilling data acquisition system, wherein the analog data reception circuit and analog-to-digital conversion circuit are electrically isolated from the digital data transmission circuit of the data reception device;
converting at least a portion of the analog measurement-while-drilling data into digital measurement-while-drilling data using the analog-to-digital conversion circuit; and
sending the digital measurement-while-drilling data as transmitted digital measurement-while-drilling data via the digital data transmission circuit of the data reception device.

14. The method of clause 13, wherein the measurement-while-drilling data acquisition system is positioned at least 10 feet from a source of analog measurement-while-drilling data.

15. The method of clause 13, further comprising galvanic isolation of the analog measurement-while-drilling data and the transmitted digital measurement-while-drilling data.

16. The method of clause 13, further comprising at least partially powering the data reception device using at least one battery capable of supplying a total of 3 Volts or more.

17. The method of clause 13, wherein the digital data transmission circuit is configured to transmit digital data to a remote computer system wirelessly on one of the following frequencies: 433 MHz, 900 MHz, 2.4 GHz, or 5.8 GHz.

18. The method of clause 13, wherein the digital data transmission circuit is configured to transmit digital data via one of RS-232, RS-422, RS-485, Ethernet, USB or CAN bus, to a remote computer system via a data cable.

19. The method of clause 18, wherein the data cable is further configured to provide at least 100 mW power to the data reception device.

20. The method of clause 13, wherein electrically isolating the analog data reception circuit and the analog-to-digital conversion circuit of the data reception device comprises galvanically isolating the analog data reception circuit and the analog-to-digital conversion circuit from the digital data transmission circuit.

21. A method of operating a plurality of measurement-while-drilling (MWD) data acquisition systems, the method comprising:
receiving, at the plurality of MWD acquisition systems, analog MWD data at analog data reception circuits of multiple data reception devices each having a digital data transmission circuit, wherein the analog data reception circuits and analog to digital data transmission circuits are electrically isolated from digital data processing circuits and the digital data transmission circuits in each of the data reception devices;
converting at least a portion of the analog MWD data into digital MWD data using the analog-to-digital conversion circuits;
sending the digital MWD data as digital data transmissions via the digital data transmission circuits;
aggregating the digital data transmissions from the MWD data acquisition system at a central computer;
comparing received signals from the plurality of MWD data acquisition systems; and
determining an optimal channel to decode on based on at least one of the following parameters: signal to noise ratio based on the received signal strengths, bit error detection, signal amplitude, or total harmonic distortion.

22. The method of clause 21, further comprising decoding the digital data transmissions using the optimal channel.

What is claimed is:
1. A method of operating a measurement-while-drilling data acquisition system, the method comprising:
receiving analog measurement-while-drilling data at an analog data reception circuit of an analog section of a data reception device also having a digital section comprising a digital data transmission circuit of the measurement-while-drilling data acquisition system, wherein:
a battery, separate from the data reception device and electrically coupled to the analog section, provides analog section power to the analog section,
a data cable, separate from the data reception device and electrically coupled to the digital section, provides digital section power to the digital section from a power source separate from the battery,
the analog section power that is used to power the analog section is isolated from the digital section power by a power isolation circuit, and
the analog data reception circuit and an analog-to-digital conversion circuit of the analog section are electrically isolated from the digital data transmission circuit of the digital section by an isolation circuit;
converting at least a portion of the analog measurement-while-drilling data into digital measurement-while-drilling data using the analog-to-digital conversion circuit; and
sending the digital measurement-while-drilling data as transmitted digital measurement-while-drilling data via the digital data transmission circuit of the data reception device.

2. The method of claim 1, wherein the measurement-while-drilling data acquisition system is positioned at least 10 feet from a source of analog measurement-while-drilling data.

3. The method of claim 1, further comprising galvanic isolation of the analog measurement-while-drilling data and the transmitted digital measurement-while-drilling data.

4. The method of claim 1, wherein the analog-to-digital conversion circuit is coupled to and between the analog data reception circuit and the isolation circuit in the analog section, and the isolation circuit is configured to reduce electromagnetic interference produced by the digital section from affecting a quality of the analog measurement-while-drilling data received at the analog data reception circuit.

5. The method of claim 1, wherein the digital data transmission circuit is configured to transmit the digital measurement-while-drilling data to a remote computer system wirelessly on one of the following frequencies: 433 MHz, 900 MHz, 2.4 GHz, or 5.8 GHz.

6. The method of claim 1, wherein the digital data transmission circuit is configured to transmit the digital measurement-while-drilling data to a remote computer system via the data cable using a communication standard selected from a group of communication standards including RS-232, RS-422, RS-485, Ethernet, USB and CAN bus.

7. The method of claim 6, wherein the data cable is further configured to provide at least 100 mW power to the data reception device.

8. The method of claim 1, wherein electrically isolating the analog data reception circuit and the analog-to-digital conversion circuit of the data reception device comprises galvanically isolating the analog data reception circuit and the analog-to-digital conversion circuit from the digital data transmission circuit.

9. A system comprising:
- a downhole measurement-while-drilling (MWD) tool;
- a central computer system;
- multiple data reception devices each comprising:
  - a respective digital section comprising a respective digital data transmission circuit; and
  - a respective analog section comprising a respective analog data reception circuit, a respective analog-to-digital conversion circuit, a respective digital isolation circuit, and a respective power isolation circuit,
  - wherein:
    - the respective analog data reception circuit is configured to receive analog MWD data via an analog signal sent from the downhole MWD tool,
    - the respective analog-to-digital conversion circuit is coupled to and in between the respective analog data reception circuit and the respective digital isolation circuit, and the respective digital isolation circuit is configured to electrically isolate the respective analog-to-digital conversion circuit from the respective digital data transmission circuit,
    - the respective power isolation circuit is configured to isolate analog power received from a first power supply at the analog section from digital power received from a second power supply at the digital section,
    - the respective analog-to-digital conversion circuit is configured to convert at least a portion of the analog MWD data into digital MWD data,
    - the respective digital data transmission circuit is configured to send the digital MWD data as digital data transmission signals, and
  - the central computer is configured to:
    - aggregate the digital data transmission signals from each of the respective digital data transmission circuits,
    - compare the digital data transmission signals, and
    - responsive to comparing the digital data transmission signals, determine an optimal channel on which to decode the digital data transmission signals based on at least one of the following parameters: signal to noise ratio based on signal strengths of the digital data transmission signals, bit error detection in the digital data transmission signals, signal amplitude of the digital data transmission signals, or total harmonic distortion of the digital data transmission signals.

10. The system of claim 9, wherein the central computer is configured to decode at least one of the digital data transmissions using the optimal channel.

* * * * *